Sept. 8, 1953   Y. H. SMILEY   2,651,062
APPARATUS FOR PRESSING LAMINATED MATERIALS
Filed Nov. 26, 1947   2 Sheets-Sheet 1
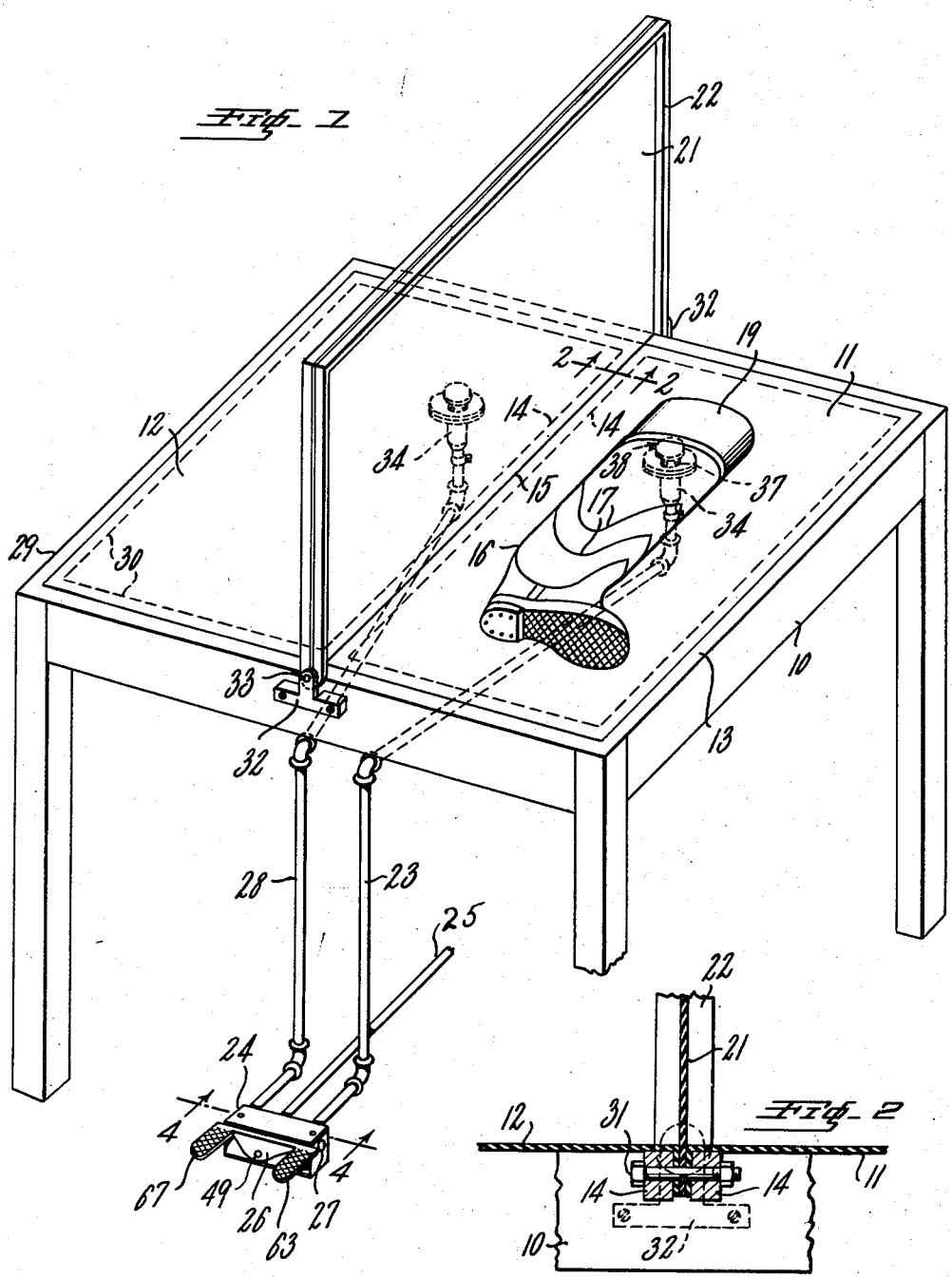
INVENTOR.
YALE H. SMILEY
BY
William N. Epes
ATTORNEY

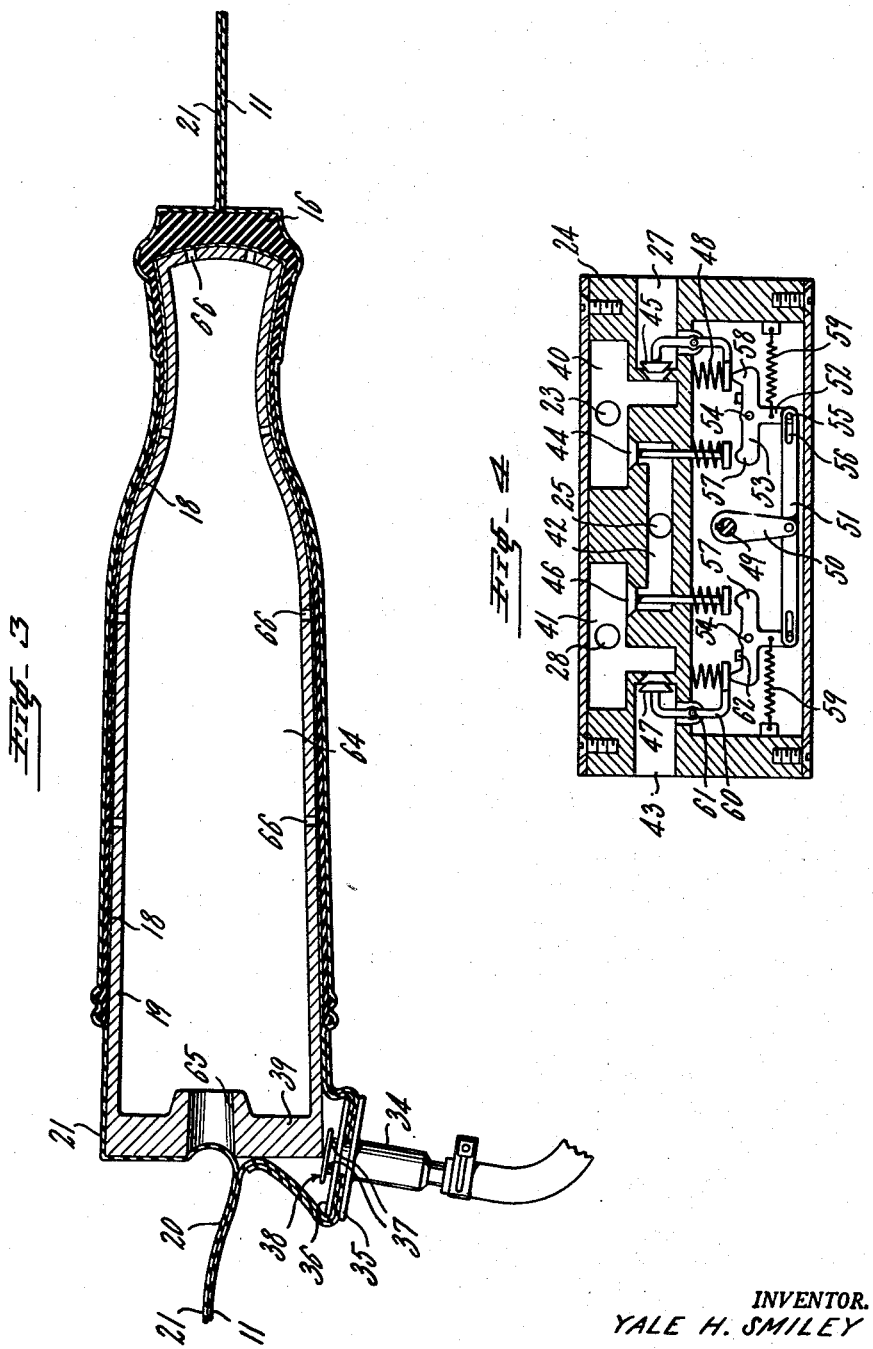

Patented Sept. 8, 1953

2,651,062

UNITED STATES PATENT OFFICE 2,651,062

APPARATUS FOR PRESSING LAMINATED MATERIALS

Yale Hertle Smiley, Kitchener, Ontario, Canada, assignor to United States Rubber Company, New York, N. Y., a corporation of New Jersey Application November 26, 1947, Serial No. 788,244

3 Claims. (Cl. 12—1)

This invention relates to an apparatus for pressing plastic laminated materials, such as the parts of rubber footwear containing unvulcanized layers of rubber, or rubber-like compositions, prior to the vulcanization of the assembled article of footwear.

In the manufacture of certain types of rubber footwear, the parts comprising an inner layer of fabric and one or more layers of tacky unvulcanized rubber or rubber composition, are built up on a last to form the assembled article of footwear, which is subsequently vulcanized. During the assembly of the parts small pockets of air are sometimes trapped between the layers of the rubber, or between the inner layer of fabric and the layers of rubber superimposed thereon. After the layers of material have been initially assembled on the last they are poorly bonded together and may be separated in places by small air pockets. Several types of apparatus have been used heretofore for pressing the layers together to remove the air and produce an adhesive bond therebetween. The present apparatus is an improvement over the prior apparatus which has been used for that purpose.

In the apparatus embodied in the present invention, the article of footwear to be pressed is sealed within a relatively thin, flexible, elastic envelope which may be made of sheet rubber. Sub-atmospheric pressure is produced within the envelope and its walls are forced into intimate contact with the outer surfaces of the footwear by the differential of pressure between the outside atmospheric pressure and the sub-atmospheric pressure within the envelope. Such construction has the following advantages over the prior types of apparatus which has been used to press the tacky unvulcanized layers of rubber contained in the lasted article of footwear: (1) it reduces the time, labor and skill required in the prior hand-rolling operation, (2) the same apparatus is capable of pressing a wide range of sizes and shapes of articles of footwear since the envelope is not molded to any particular size or shape, but on the other hand it may be formed by two thin, rubber sheet diaphragms of a size to envelop an article of footwear of the largest size desired to be produced, (3) the sub-atmospheric pressure within the envelope is effective for causing the air pockets between the layers to expand and be removed as a result of such expansion independently of the external pressure of the envelope on the outer surfaces of the article of footwear, (4) the thin envelope conforms closely to the irregular surfaces of the footwear and does not bridge the stepped back edges of the layers of rubber, and (5) the impervious envelope causes the outside higher pressure air to press inwardly on the entire outside area of the article of footwear and thus causes all layers of the parts laminated thereon to be pressed between the higher outside pressure of the air acting on the flexible, elastic, impervious envelope, and the inflexible surface of the last, on which these laminated parts are built, and thus bond all parts together without necessarily subjecting the interior of the footwear to sub-atmospheric pressure through the walls of a hollow last.

The invention is further described in reference to the accompanying drawings, in which:

Fig. 1 is perspective view of the apparatus embodying this invention, in which two pressing envelopes may be formed at different times between one of the two horizontal diaphragms and the vertically extending diaphragm to enclose an article of footwear which may be placed on either of the horizontal diaphragms as shown by the boot;

Fig. 2 is a cross-section of the joint between the pressing envelope diaphragms taken on line 2—2 of Figure 1;

Fig. 3 is a cross-section of a boot being pressed by the pressing envelope formed by the upper and one of the lower diaphragms and enclosing the boot; and Fig. 4 is a cross-section of the valve mechanism for controlling the exhaust of air from and the admission of air to the pressing envelope, and which is taken on line 4—4 of Fig. 1.

An apparatus embodying this invention is shown in Fig. 1 of the drawings. It comprises a table 10 having two diaphragms 11 and 12 stretched across its top frame 13, which is provided with cross members 14, over which the line of division 15 between the diaphragms is formed. The diaphragms 11 and 12 are formed of relatively thin flexible elastic rubber or rubber-like composition, and each of them is adapted to support an article of rubber footwear 16 containing exterior layers 17 of tacky plastic unvulcanized rubber and an inner layer 18 of fabric lining material (Fig. 3), which are built up on a last 19. The article of footwear shown herein is a rubber boot, and is adapted to be enclosed in a pressing envelope 20 (Fig. 3) which may be formed by pivoting an upper diaphragm 21 over the boot 16 supported by the diaphragm 11. The diaphragm 21 is similar to the diaphragms 11 and 12, and is stretched in a frame 22, which may be pivoted from its vertical position in Fig. 1 to a horizontal position over the diaphragm 12 to form another pressing envelope around a boot which may be supported on the diaphragm 12.

Since the envelopes formed by superimposing the pivotal diaphragm 21 over either the diaphragms 11 or 12 are substantially of the same construction and they operate in the same manner for pressing the boot 16, only one of the pressing envelopes in its pressing position around the boot is shown, as in Fig. 3, and will be described in detail as to its operation on the boot.

When the envelope 20 is so formed, the boot 16 may be pressed by exhausting the air from the envelope through a pipe 23, which may be connected through a valve casing 24 to a vacuum line 25. The valves in the casing 24 are controlled by a foot pedal 26 which is adapted to alternately connect the pipe 23 and disconnect it from the vacuum line 25 and an atmospheric port 27.

Upon connecting the envelope 20 to the vacuum line 25, its walls comprising the diaphragms 11 and 21 are pressed into intimate contact with the outer surface of the boot 16, as shown in Fig. 3, and the layers of material contained in the boot are subjected to a pressure per square inch equal to the differential in pressure per square inch within the envelope and the normal atmospheric pressure per square inch on the outside of the envelope. The required pressure differential may be produced and retained over the required period of time to eliminate air pockets and adequately compact the layers of material to secure good adhesion therebetween as may be determined by the operator. The envelope which may be formed between the diaphragms 21 and 12 may be similarly operated by alternately exhausting and admitting air thereto through the pipe 28, which may be alternately connected and disconnected with the vacuum line 25 and the outside atmosphere.

Three sides of the diaphragms 11 and 12 are secured in the table top frame 13 by clamping the outer edges thereof between the outer frame members 29 and the inner strips 30. As shown in Fig. 2, the fourth sides of the diaphragms 11 and 12 are secured in the frame 13 by clamping their edges between the cross members 14 which are drawn together by the bolts 31. The lower edge of the pivoted diaphragm 21 extends between the adjoining edges of the diaphragms 11 and 12 and is also clamped in such position by the bolts 31. The frame 22 for the diaphragm 21 is supported on brackets 32 secured to the opposite sides of the table top frame 13, and the frame 22 is pivoted on pins 33 in the brackets 32. The pins 33 are arranged in alignment with the line 15 formed by the intersecting planes of the diaphragms 11, 12, and 21. Therefore the frame 22 and the diaphragm 21 are hinged on the same axis. The frame 22 is larger than the area of the top of the table 10 which it is adapted to cover, and when it is pivoted to the horizontal position over either of the bottom diaphragms 11 or 12, the outer margin of one of the surfaces of the diaphragm 21 forms a hermetically sealed contact with the outer margin of the diaphragms 11 or 12.

The pipes 23 and 28 are connected to the pressing envelopes by nipples 34, which are connected to the pipes and extend through the lower diaphragms 11 and 12. The nipples 34, as shown in Fig. 3, are provided with flanges 35 and 36 between which the diaphragms 11 and 12 are clamped to form sealed joints around the nipples. The nipples 34 are provided with orifices 37 which open into the pressing envelopes. A protective flange 38 is formed on the nipples 34 above the orifices 37 to provide a rest for the upper end 39 of the last 19 to rest upon, and prevent the walls of the envelopes formed by the diaphragms from closing the orifices before the desired degree of sub-atmospheric pressure is reached within the envelope.

Referring to Fig. 4, the pipe 23 leading from the valve casing 24 to the diaphragm 11 is connected to a chamber 40 in the valve casing 24, and the pipe 28 leading from the valve casing to the diaphragm 12 is connected to a chamber 41 in the valve casing. The vacuum line 25 is connected to a chamber 42 in the valve casing, which is also provided with atmospheric ports 27 and 43. The pipe 23 may be alternately connected and disconnected to and from the vacuum port 42 by valve 44, and the pipe 23 may be alternately connected and disconnected to and from the atmospheric port 27 by valve 45. Similarly, the pipe 28 may be alternately connected and disconnected to and from the vacuum chamber 42 by valve 46, and the pipe 28 may be alternately connected and disconnected to and from the atmospheric port 43 by a valve 47. All of these valves 44 to 47 are pressed toward their closed positions by separate springs 48. The valves are controlled by the foot pedal 26, which is keyed to a shaft 49, which extends into the interior of the casing 24. An arm 50 is affixed to the shaft 49 and it actuates the valves through a linkage mechanism comprising a link 51 pivotally connected to the arm 50 and having at each end thereof a loss motion or slidable connection with the arms 52 of T-shape levers 53, which are pivoted on pins 54 to the valve casing 24 and are adapted to operate the valves. The loss motion connections are formed by the pins 55 fixed to the arms 52 of the levers 53, and which are slidable in the slots 56 in the ends of the link 51. The vacuum line valves 44, 46 and the atmospheric valves 45, 47 are operated respectively by the rocking movement of the arms 57 and 58 of the levers 53, and the loss motion connection between the ends of the link 51 permits the sets of the valves 44 and 45, and 46 and 47 to be operated individually, that is, one set may be operated without operating the other. Tension springs 59 are connected between the arms 52 of the levers 53 and the valve casing 24 and are adapted to hold the atmospheric air valves 45 and 47 in their open positions against the action of their springs 48 when the pedal 26 is in its normal horizontal position, that is, its released position at the time it is not being acted upon by the operator's foot. The arms 57 of the T-shaped levers 54 are normally spaced from the stems of the vacuum line valves 45 and 46 by the action of the springs 59, and thereby normally permit the springs 48 of these valves to hold them in their closed positions. The atmospheric air valves 45 and 47 are carried by D-shaped levers 60, which are pivoted on the valve casing 24 by pins 61, and their opening movements are arrested by stops 62 on the casing which limit the upward movement of the arms.

The springs 59 also retain the foot pedal 26 normally in a horizontal position as shown in Fig. 1.

In the operation of the apparatus, the lasted article of footwear, such as the boot 16, is placed on one of the bottom diaphragms, for example the diaphragm 11, with the upper end of the last 19 resting upon the protecting flange 38 of the nipple 34. The operator pivots the frame 22 to a horizontal position over the diaphragm 11 so as to form a sealed envelope around the boot 16. Air is then exhausted from the envelope 20 formed around the boot 16 by depressing the arm 63 of the foot pedal 26, which rocks the T-shaped lever 54 associated with the valves 44 and 45, and permits the valve 45 to close and opens the vacuum line valve 44. The differential of pressure thus formed between the interior and exterior of the envelope 20 forces its relatively thin elastic and flexible walls into intimate contact with the outer surface of the boot 16. As shown in cross-section in Fig. 3, the last upon which the boot is built has a cavity 64 extending throughout its length. The upper end 39 of the last 19 has an opening 65 which communicates with the interior of the envelope 20 and the cavity 64. The walls of the cavity are provided with passages 66 which allow air to escape from between the interior walls of the boot 16 and exterior walls of the last 19 under the pressure of the envelope.

While the boot is being pressed in the envelope 20 between the diaphragms 21 and 11, another boot is placed upon the diaphragm 12. After the boot 16 on the diaphragm 11 has been pressed, the arm 63 of the foot pedal 26 is released by the operator and allowed to return to its normal horizontal position. In the normal position, communication between the vacuum line 25 and the envelope 20 formed between the diaphragms 21 and 11 is cut off by the closure of the valve 44, and atmospheric air pressure is produced within the envelope 20 by opening the valve 45 and admitting atmospheric air through the port 27. The diaphragm 21 is then pivoted over the boot 16 on the diaphragm 12 to form an envelope around the boot. Air is exhausted from the last formed envelope by depressing the arm 67 of the foot pedal 26 which closes the atmospheric port 43 and opens the vacuum line 25 to the envelope. While the pressing operation is being carried out on the boot resting on the diaphragm 12, the boot 16 resting on the diaphragm 11 is replaced by another boot. After the pressing operation has been completed on the boot resting on the diaphragm 12, the arm 67 of the foot pedal 26 is released, and atmospheric air is thereby admitted to the envelope after its communication with the vacuum line 25 has been cut off. The diaphragm 21 may then be pivoted through approximately 180° over the boot which has been placed on the diaphragm 11, and the foregoing cycle of pressing operations may thus be repeated.

It is desirable that the diaphragms 11, 12 and 21 forming the respective envelopes around the article of footwear be made very thin, flexible and elastic in order that they may conform as closely as possible to the contour of the irregularly shaped article to be pressed. It is necessary, however, that the envelope have sufficient strength to withstand the differential of pressures between the inner and outer surfaces of the envelope where it is unsupported over small areas, and also to withstand the normal wear during the operation of the apparatus. It has been found in practice that calendered sheet rubber having 600% elongation and a thickness of from .018 to 0.030 inch gives satisfactory results. Diaphragms having a substantially less thickness have too short a life and those having a substantially greater thickness bridge portions of the surfaces to be pressed where abrupt changes in surface contour occur as may be produced at the edges of stepped back layers of rubber.

While the present preferred form of the invention has been described herein, it will be understood that changes in the details thereof may be made without departing from the spirit of the invention, or the scope of the claims appended hereto.

Having thus described my invention, what I claim and desire to protect by Letters Patent is:

1. An apparatus for pressing plastic surfaces of an article having abrupt changes in its surface contour, said apparatus comprising two frames, one of which has an inner periphery adapted to fit over the outer periphery of the other, a thin sheet of impervious highly elastic material having its margin affixed to one of each of said frames and thereby held free from wrinkles during the pressing operation, said sheets being adapted to be superimposed over one another with the larger of said frames extending outwardly beyond the smaller of said frames so as to cause the margins of said sheets to be engaged and form an air-tight chamber between the sheets and about the article to be pressed, and means for subjecting said chamber to sub-atmospheric pressure to force said sheets into intimate contact with any surfaces of the article which may be initially bridged by said sheets due to the abrupt changes in its surface contour said sheets being so thin, flexible and elastic that their margins are drawn together and the parting line therebetween is in close contact with and around said article.

2. An apparatus for pressing the plastic surface of an article of footwear formed of plies of unvulcanized rubber and having abrupt changes in contour, said apparatus comprising two flat sheet diaphragms of flexible highly elastic rubber having a thickness of from .018 inch to .030 inch, a frame for each of said diaphragms, means for affixing the margins of said sheet to said frames for holding the sheets in a fixed position free from wrinkles, a pivotal joint pivotally connecting one frame to the other so that the diaphragm in one frame is adapted to be pivoted in respect to and superimposed upon the diaphragm in the other frame to enclose the article of footwear therebetween within an air-tight envelope, means for evacuating air from between said diaphragms and thereby cause the outside atmospheric pressure to force said diaphragms into intimate contact with said article over its entire surface said diaphragms being so thin, flexible and elastic that their margins are drawn together and the parting line therebetween is in close contact with and around said article of footwear.

3. An apparatus for compacting plastic unvulcanized layers of rubber footwear having abrupt changes in its surface contour, said apparatus comprising three thin elastic, impervious, sheet diaphragms, a frame for each of said diaphragms, the edges of each diaphragm being affixed to its respective frame to maintain the diaphragms free from wrinkles, two of said frames being stationary and having adjoining sides, said third frame being pivoted on the line of said adjoining sides so that the diaphragm therein may be pivotally superimposed over either of the stationary diaphragms and form a sealed envelope around the footwear placed therebetween, means for evacuating air from between said superimposed diaphragms and thereby cause the outside atmospheric pressure to force said superimposed diaphragms into intimate contact with any surfaces of the footwear which may be initially bridged by said diaphragms due to abrupt changes in the contour of the surface of the footwear.

YALE HERTLE SMILEY.

References Cited in the file of this patent

UNITED STATES PATENTS

| Number | Name | Date |
|---|---|---|
| 1,090,535 | Hill | Mar. 17, 1914 |
| 1,158,389 | Piper | Oct. 26, 1915 |
| 1,274,206 | Shuman | July 30, 1918 |
| 1,782,852 | Jeffray | Nov. 25, 1930 |
| 1,905,211 | Boynton | Apr. 25, 1933 |
| 2,028,927 | Sherts | Jan. 28, 1936 |
| 2,028,928 | Sherts | Jan. 28, 1936 |
| 2,283,946 | Pitman | May 26, 1942 |
| 2,392,108 | Vidal | Jan. 1, 1946 |

FOREIGN PATENTS

| Number | Country | Date |
|---|---|---|
| 332,385 | Great Britain | July 24, 1930 |
| 353,482 | Italy | Oct. 19, 1937 |
| 494,885 | Great Britain | Nov. 3, 1938 |